United States Patent Office 3,331,676
Patented July 18, 1967

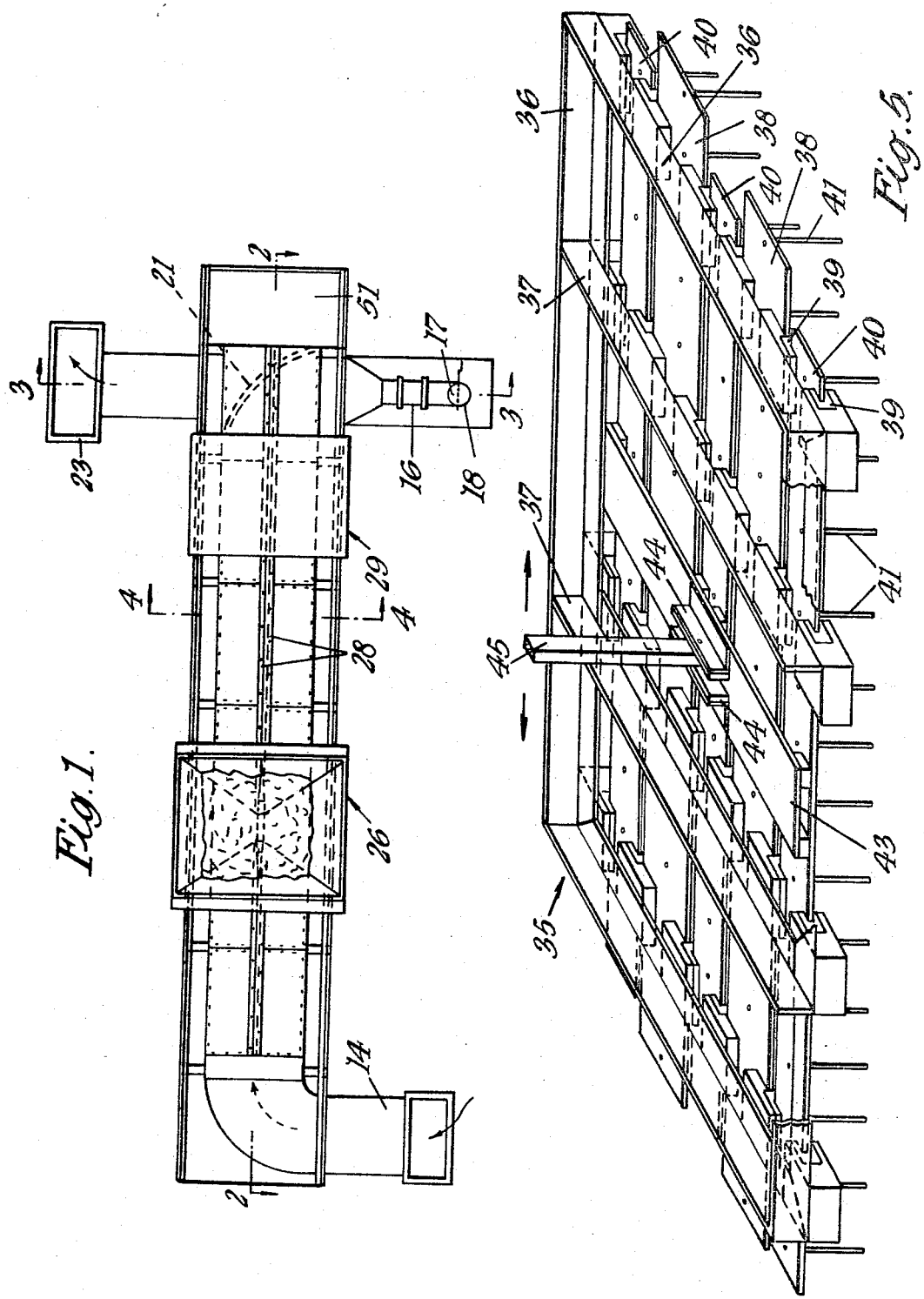

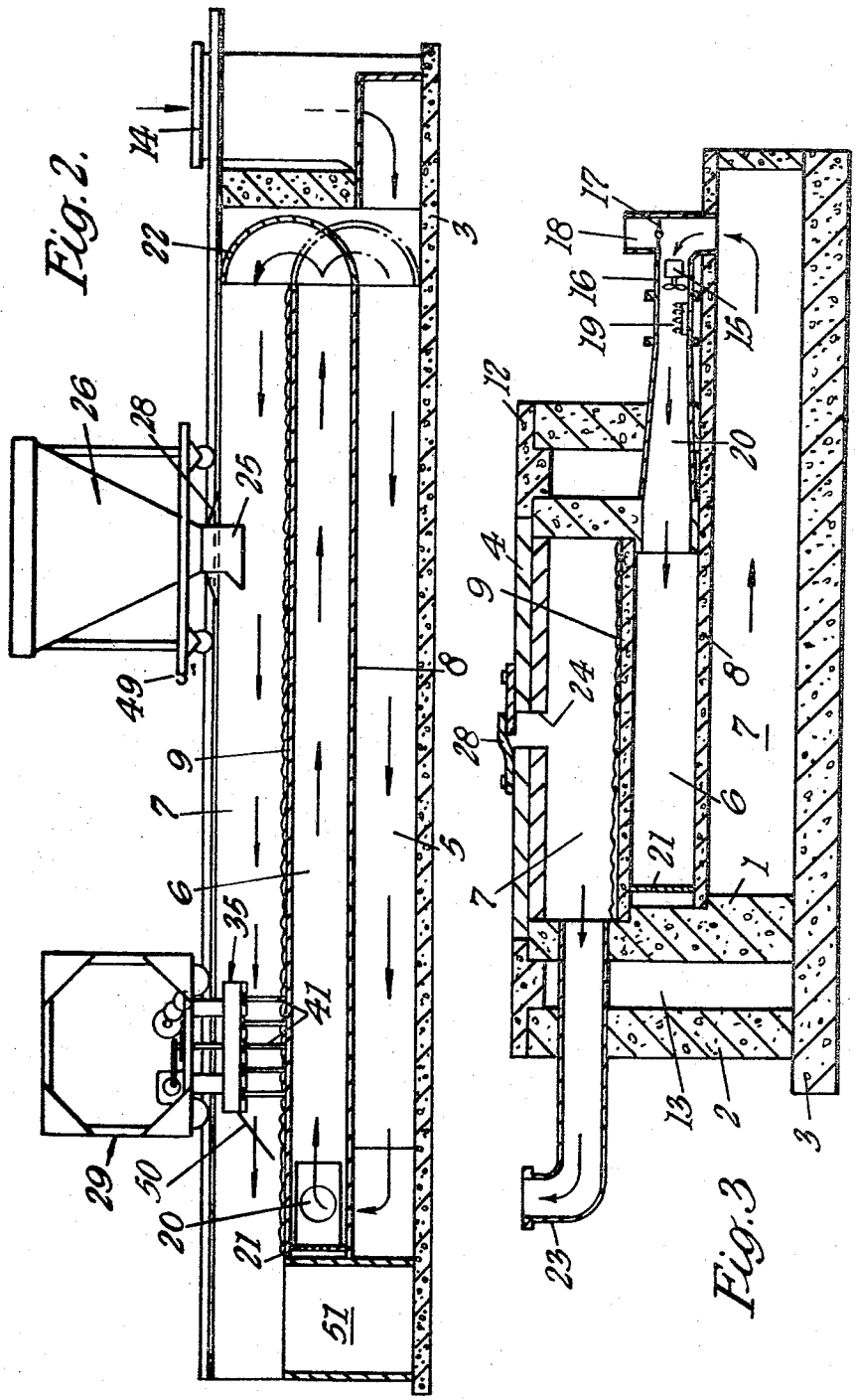

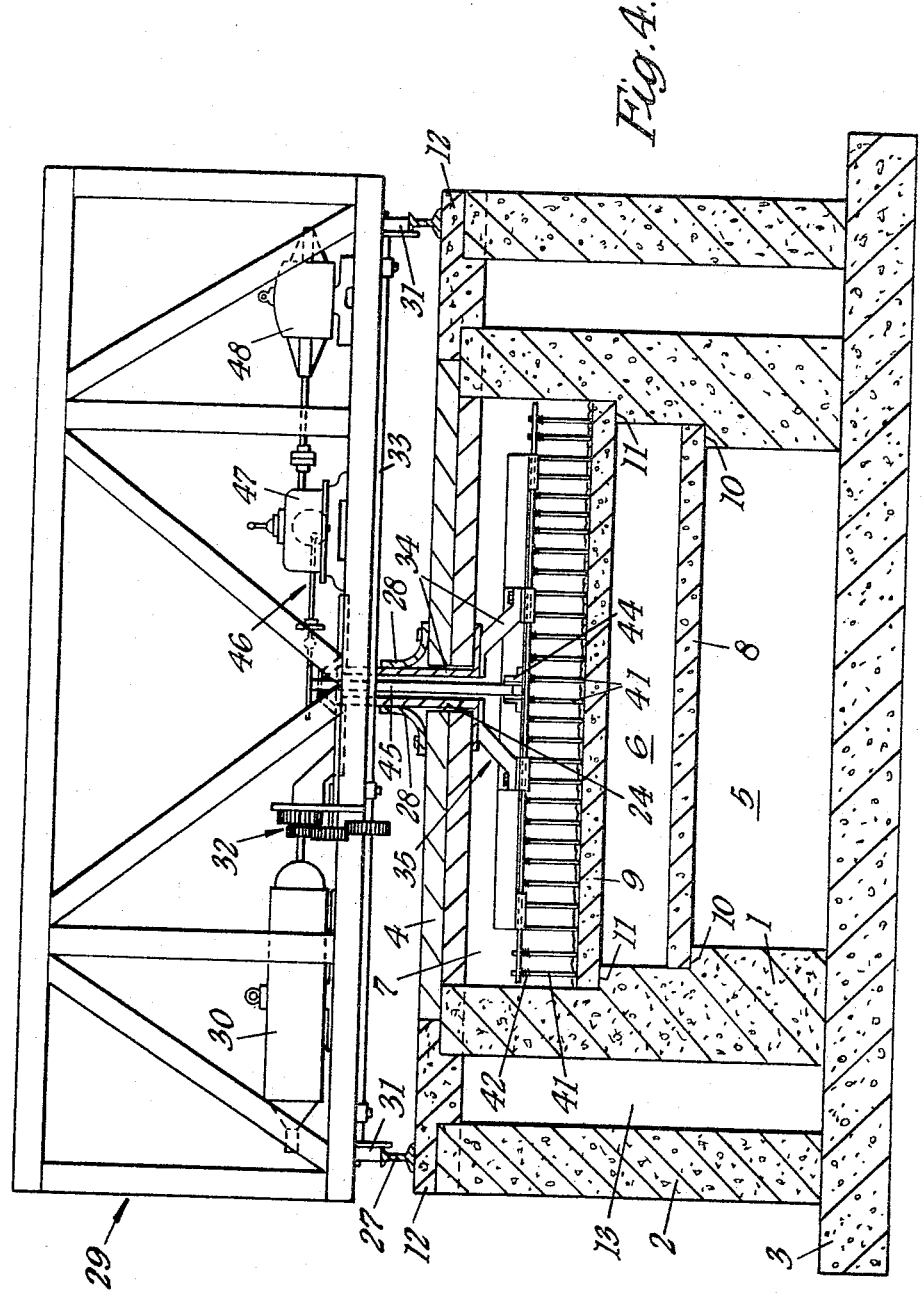

3,331,676
METHOD OF PREPARING FERTILIZER AND AGRICULTURAL STOCK FEED FROM MANURE
Mervyn Gwilym Glyn Roblin, Reading, England, assignor to Hydraulic Developments Limited, Reading, England, a British company
Filed Mar. 2, 1964, Ser. No. 348,666
Claims priority, application Great Britain, Mar. 4, 1963, 8,557/63; Oct. 30, 1963, 42,800/63
4 Claims. (Cl. 71—21)

This invention relates to fertilizers, and material suitable for use, after re-fortification, as agricultural stock feed, and is concerned more particularly with their production from poultry excrement and similar excrement in liquid and/or solid form, from other livestock such as cows, pigs, sheep and horses, such excrement being referred to generally as farm effluent.

Due to the present-day practice of keeping livestock in large numbers in a relatively small space, large quantities of effluent are produced. At present, the disposal of this presents serious problems, and adequate precautions must also be taken to prevent the spread of disease from the effluent. Furthermore, although the effluent contains a relatively high proportion of nitrogen, phosphate and potash, and would therefore be valuable as a fertilizer or for use with re-fortification as agricultural stock feed, it cannot be employed for these purposes since its physical characteristics and the fact that it is not sterilized render its transport and application impracticable.

It is an object of the present invention to overcome or alleviate the above difficulties by producing from farm effluent a useful and manageable fertilizer or material suitable for use with re-fortification as agricultural stock feed.

The present invention consists in a method of producing from excrement a fertilizer, or material suitable for use, after re-fortification, as agricultural stock feed, which includes drying the excrement by heating under controlled conditions until it is in the form of granulated material containing less than 15%, and preferably less than 10%, moisture by weight, whilst simultaneously stirring and cutting, or otherwise mechanically working, the excrement to keep it in an open friable condition to prevent it binding or burning.

In the accompanying drawings:
FIGURE 1 is a diagrammatic plan view of one form of apparatus for carrying out the present invention,
FIGURE 2 is a diagrammatic longitudinal section taken on line 2—2 of FIGURE 1,
FIGURE 3 is a diagrammatic cross-section taken on line 3—3 of FIGURE 1,
FIGURE 4 is a diagrammatic cross-section taken on line 4—4 of FIGURE 1, and
FIGURE 5 is a diagrammatic general view of a detail of the apparatus of FIGURE 1.

In carrying the invention into effect according to one convenient mode by way of example, the accompanying drawings show apparatus for producing a fertilizer from poultry excrement.

The apparatus includes a pair of spaced parallel inner walls 1, composed of concrete, each having an outer concrete wall 2 spaced therefrom and parallel thereto, all the walls 1 and 2 extending in a longitudinal direction and resting upon a concrete base member 3.

A concrete cover 4 extends between the tops of the two inner walls 1, and the space thus defined between the inner walls 1 and the cover 4 is sub-divided into a lower chamber 5, an intermediate chamber 6 and an upper chamber 7 by means of a concrete lower dividing member 8 and a concrete upper dividing member 9 disposed horizontally and resting upon the steps 10 and 11, respectively, formed in the inner surfaces of each inner wall 1.

The adjacent tops of each inner wall 1 and its adjacent outer wall 2 are joined by a member 12, and their ends are also joined so as to provide sealed heat insulating cavities 13 on each side of the chambers 5, 6 and 7.

Warm air from the room in which the apparatus is situated is drawn into one end of the lower chamber 5 through an inlet 14 and then along the entire length of the lower chamber 5 by means of a fan 15 mounted in a conduit 16 connected to the other end of the lower chamber 5. A regulator 17 is provided so that further air may be drawn into conduit 16 from the room through a further inlet 18 if so desired.

Under the influence of the fan 15, the air passes through conduit 16 over a burner or heater 19 and thence through a hood 20 into one end of the intermediate chamber 6 and onto a curved deflector 21 which directs the stream in the direction of the intermediate chamber 6.

The air stream then passes back in the reverse direction along the entire length of the intermediate chamber 6 until it reaches the far end where it is deflected by a further deflector 22 to pass in the first direction through the upper chamber 7 until it finally passes out through outlet 23 situated outside the room in which the apparatus is located.

It will be appreciated that with this arrangement, the air stream in the lower chamber 5 is pre-heated by the heat from the other two chambers 6 and 7, and the loss of heat downwardly from these chambers is reduced. The upper chamber 7 is similarly pre-heated by the intermediate chamber 6. In an alternative arrangement, not shown, the lower chamber 5 may be arranged to constitute a sealed heat insulating cavity, in which case warm air is drawn into conduit 16 directly from the room.

The further deflector 22 is moveable to a lower position, shown in phantom, in which air having travelled through the intermediate chamber 6 is recirculated back through the lower chamber 5. Under these conditions, there is no forced air through the upper chamber 7, but heating of this chamber from underneath is maintained as long as the burner or heater 19 and the fan 15 are kept in operation.

The upper dividing member 9 is arranged to provide a support surface for a layer of excrement undergoing treatment in the upper chamber 7.

The cover 4 is provided with a central longitudinal slit 24 through which extends a delivery chute 25 of a travelling hopper 26 mounted on wheels for longitudinal movement upon rails 27 resting upon members 12.

In order to prevent the escape of gas from the upper chamber 7, the slit 24 is provided with two co-operating flaps 28 which normally engage each other to seal the slit 24, but which permit the chute 25 to pass through the slit into the upper chamber 7 and also permit it to move longitudinally in the slit whilst maintaining the seal in front of, and behind, the chute 25.

A travelling agitating device 29 is also mounted on wheels for longitudinal movement upon rails 27. The device 29 carries an electrical motor and brake 30 for driving its wheels 31 through a gear train 32 and an axle 33 so that the device 29 may be driven along the rails 27 as required. When required, the device 29 may be coupled to the hopper 26, by means of a link 49 on the hopper 26, for traction purposes.

The device 29 also carries a pair of arms 34 which extend downwardly through the slit 24 into the upper chamber 7 where they are secured to a framework 35. This framework is shown more clearly in FIGURE 5 and consists of a rectangular frame 36 having two longitudinal stiffening angle members 37.

Secured to frame 36 and 37 are two fixed combs 38 and a number of bearings 39 carry three moveable combs 40 mounted for movement in the bearings 19 transversely of the apparatus.

Each comb 38 or 40 consists of a metal arm to which are secured a number of spaced parallel fingers 41 extending downwardly with their ends closely spaced from the surface of the upper dividing member 9. Each finger 41 is resiliently mounted by means of a portion 42 wound in spring configuration adjacent to the arm to which it is secured. Each comb 38 or 40 is provided with a row of eighteen fingers equally spaced 3½″ apart. Each finger is 4″ long and 5/32″ in diameter.

The three moveable combs 40 are secured to a common arm 43 connected by means of flanges 44 to an operating arm 45 which extends upwardly between the arms 34 through the slit 24. The upper end of the operating arm is connected through a reciprocating link 46 to a four-speed gearbox 47 and a variable speed electrical motor 48 both mounted upon the structure of the agitating device 29. In this way, the moveable combs 40 may be reciprocated transversely at any desired speed.

To load the apparatus the hopper 26 is first pushed with the aid of the device 29 to the right hand side of the apparatus, as seen in FIGURE 2, where it receives a quantity of excrement from a bulk supply (not shown). The hopper 26 is then drawn from one end of the apparatus to the other, distributing the excrement into the upper chamber 7 through chute 25 as it goes. The hopper 26 and device 29 are then returned to the right hand side of the apparatus, and during this movement, a blade 50 on the device 29 is lowered to a fixed height to level out the deposited excrement to a uniform layer of desired thickness.

Using an effective surface area of the upper dividing member 9 of seventy feet by four feet four inches, between one ton and twenty-five hundredweight of excrement may be spread out into a layer approximately two inches thick.

The hopper 26 is then uncoupled from the device 29, and the device 29 is used to agitate the excrement, travelling backwards and forwards over it, during heating, at various times to be described more fully hereinafter.

After the treatment has been completed, the device 29 is driven to the righthand side of the apparatus as shown in FIGURE 2, the blade 50 is lowered until it is almost touching the surface of the upper dividing member 9, and the device 29 is driven to the other end of the apparatus so that the blade 50 functions as a scoop or shovel to deliver the final product into a receptacle 51.

In operation, the excrement, loaded into the upper chamber with a moisture content of probably 70%, is subjected to the following heat treatment:

(1) The temperature of the excrement is raised as quickly as possible to 212° F. and is maintained at this temperature for one hour, with an air speed of 25 m.p.h. During this time, gases with an unpleasant odour are given off probably containing a proportion of methane or like gas. No agitation is used during this stage.

(2) For the next half hour, the temperature is reduced to 190° F., the air speed is maintained at 25 m.p.h., and agitation is carried out at the rate of a complete traversal of the apparatus from one end to the other, and back again, in a period of three minutes, this being repeated at an interval of every seven minutes. During traversal the combs are reciprocated at the rate of ten strokes per second. During this stage practically no detectable gas is given off by the excrement.

(3) For the next half hour, the temperature is again raised to 212° F., the air speed is reduced to 10 m.p.h., and agitation is carried out at the rate of a complete traversal in a period of three minutes, this being repeated at an interval of approximately every fifteen minutes. During this stage ammonia is given off, and the agitation is carried out sufficiently vigorously and sufficiently often to prevent its burning or binding to a hard concrete-like mass, but yet permitting the formation of a crust or surface casing of phosphate to retain organic nitrogen in the excrement.

(4) For a final period of half an hour, the temperature is reduced to between 140° F. and 150° F., the flow of air is cut off, and the agitation is discontinued except for the last few minutes of this stage when the final product, having had its moisture content reduced to less than 15%, and preferably between 10% and 8%, is mildly agitated. The product is then in the form of a granular material.

The most valuable component of the final product are organic nitrogen, nitrogen compounds, which are very unstable and easily lost. The excrement is spread relatively thinly, say in a layer between 1″ and 3″ thick over a heated base and heated by hot dry air in an enclosed space so that the lower and upper surfaces of the excrement are dried rapidly to form a crust or phosphate casing, enclosing the wetter excrement. In order to prevent the crust or casing burning or binding to a hard concrete-like mass it is necessary, at intervals, to stir the excrement rapidly and thoroughly for its entire thickness in order to mix the then broken crust or casing with the wetter centre portion. After this, a new crust or forms rapidly, but with a drier centre portion than before. As explained above, this process is repeated at certain intervals to reduce an original moisture content of, say, 70% to a final value of less than 15% and preferably between 10% and 8%.

If desired, it is through that the initial drying stage (1) above might be eliminated if suitable measures are taken to dry the excrement, externally of the apparatus, to the state where stage (2) above can be commenced as soon as the excrement is introduced into the apparatus.

The composition of the final product will vary considerably with the composition of the initial excrement, and with the conditions of the treatment, but one such product was found to contain 13% $P_2O_5$ and 7.8% N.

It is believed that under various circumstances there may be obtained up to 22% of $P_2O_5$ and up to 10% N. Useful lower limits would be 10% $P_2O_5$ and 4% N. The product may be used directly as a fertilizer, or with appropriate re-fortification at an appropriate stage in the process, as agricultural stock feed.

Since the heated air leaving the outlet of the upper compartment will contain a vapour having a high nitrogen content, suitable means are provided for condensing and/or dissolving this in water to provide a liquor having valuable properties as a fertilizer. If desired, pure liquid ammonia may be extracted subsequently from this liquor.

Various modifications may be made within the scope of the present invention.

I claim:

1. A process for the treatment of excrement, which includes the steps of spreading out said excrement in a relatively thin layer, applying sufficient heat to said excrement to thereby dry rapidly its surfaces to form a phosphate crust enclosing wetter excrement, during heating stirring said excrement to break said crust and to thoroughly mix the broken crust with the said wetter excrement, thereafter intermittently stirring said excrement whenever a crust has been reformed on the excrement, continuing said heating and said intermittent stirring until the excrement is in the form of a granular material containing less than 15% moisture by weight, and recovering the granular material.

2. A process for the production of a fertilizer from excrement, which includes the steps of spreading said excrement in a relatively thin layer, applying sufficient heat to said excrement to thereby dry rapidly its surfaces and promote the formation of a phosphate crust upon said excrement, intermittently stirring said excrement whenever said crust has been formed to break said crust and mix it with said excrement, discontinuing said heat and said stirring when the excrement is in the form of a granular material containing less than 15% moisture by weight, and recovering said granular material for use as a fertilizer.

3. A process for the production of a fertilizer from excrement, which includes the steps of spreading said excrement in a relatively thin layer having horizontal upper and lower surfaces, applying sufficient heat to said surfaces to cause rapid drying thereof and the formation of a phosphate crust enclosing wetter excrement, intermittently breaking said crust and mixing it with said wetter excrement, discontinuing said heating and intermittent breaking when the excrement is in the form of a dry granular material, and receiving said granular material for use as a fertilizer.

4. A process for the production of a fertilizer from excrement, which includes the steps of arranging the excrement in a thin layer, applying sufficient heat to the excrement to cause rapid drying thereof with the formation of a phosphate crust on the surfaces of the layer, with wetter excrement between, breaking said crust and mixing it with said wetter excrement to prevent the crust turning to a hard concrete-like mass, continuing said heating and said breaking and mixing until the excrement is in the form of a granular material containing less than 15% moisture by weight, between 4% and 10% N, and between 10% and 22% $P_2O_5$, and recovering said granular material for use as a fertilizer.

References Cited
UNITED STATES PATENTS

| | | | |
|---|---|---|---|
| 1,320,405 | 11/1919 | Mudd | 71—21 |
| 1,420,596 | 6/1922 | Webster | 71—21 |
| 1,496,834 | 6/1924 | Thompson | 71—21 |
| 2,906,615 | 9/1959 | Dumore | 71—21 |
| 3,022,155 | 2/1962 | Syers | 71—64 X |

S. LEON BASHORE, *Acting Primary Examiner.*

DONALL H. SYLVESTER, ANTHONY SCIAMMANA, R. BAJEFSKY, *Assistant Examiners.*